United States Patent [19]

Kresge et al.

[11] Patent Number: 5,211,934

[45] Date of Patent: May 18, 1993

[54] SYNTHESIS OF MESOPOROUS ALUMINOSILICATE

[75] Inventors: Charles T. Kresge, West Chester, Pa.; Michael E. Leonowicz, Medford Lakes, N.J.; Wieslaw J. Roth, Sewell, N.J.; James C. Vartuli, West Chester, N.J.

[73] Assignee: Mobil Oil Corp., Fairfax, Va.

[21] Appl. No.: 834,452

[22] Filed: Feb. 12, 1992

Related U.S. Application Data

[63] Continuation-in-part of Ser. No. 735,000, Jul. 24, 1991, which is a continuation-in-part of Ser. No. 625,245, Dec. 10, 1990, Pat. No. 5,098,684, which is a continuation-in-part of Ser. No. 470,008, Jan. 25, 1990, Pat. No. 5,102,643.

[51] Int. Cl.$^5$ ............................................. C01B 33/34
[52] U.S. Cl. ................................... 423/706; 423/712; 502/60; 502/77
[58] Field of Search ............... 423/277, 305, 306, 326, 423/328, 329, 263, 593, 706, 712; 502/60, 77

[56] References Cited

U.S. PATENT DOCUMENTS

| | | | |
|---|---|---|---|
| 3,567,372 | 3/1971 | Duecker et al. | 23/111 |
| 4,762,010 | 8/1988 | Borghard et al. | 73/865.5 |
| 4,859,648 | 8/1989 | Landis et al. | 502/242 |
| 5,057,296 | 10/1991 | Beck | 423/277 |
| 5,098,684 | 3/1992 | Kresge et al. | 423/277 |
| 5,102,643 | 4/1992 | Kresge et al. | 423/328 |
| 5,110,572 | 5/1992 | Calabro et al. | 423/328 |

FOREIGN PATENT DOCUMENTS 756744 10/1974 South Africa.

OTHER PUBLICATIONS

M. E. Davis, et al., "A molecular sieve with eighteen-membered rings", Nature, vol. 331, (1988), pp. 698–699.

M. E. Davis, et al., "VPI-5: The first molecular sieve with pores larger than 10 Angstroms", Zeolites, vol. 8, (1988), pp. 362–366.

D. W. Breck, Zeolite Molecular Sieves, John Wiley & Sons, Inc. (1974), pp. 272–273, 376.

*Primary Examiner*—R. Bruce Breneman

[57] ABSTRACT

There is provided a method for synthesizing a new synthetic composition of ultra-large pore crystalline material which can be used as a sorbent or catalyst component for conversion of organic and inorganic compounds. The crystalline material product of this method exhibits unusually large sorption capacity demonstrated by its benzene adsorption capacity of greater than about 15 grams benzene/100 grams at 50 torr and 25° C. This material may have a hexagonal electron diffraction pattern that can be indexed with a $d_{100}$ value greater than about 18 Angstom Units and a hexagonal arrangement of uniformly sized pores with a maximum perpendicular cross section of at least about 13 Angstrom Units. The reaction mixture for preparing this material contains a hydrolyzable source of alumina such as aluminum (isopropoxide)$_2$acetoacetic ester chelate, and a hydrolyzable source of silica, such as tetraethylorthosilicate.

5 Claims, No Drawings

SYNTHESIS OF MESOPOROUS ALUMINOSILICATE

CROSS-REFERENCE TO RELATED APPLICATIONS

This application is a continuation-in-part of U.S. application Ser. No. 07/735,000, filed Jul. 24, 1991, which is a continuation-in-part of U.S. application Ser. No. 07/625,245, filed Dec. 10, 1990, now U.S. Pat. No. 5,098,684 which is a continuation-in part of U.S. application Ser. No. 07/470,008, filed Jan. 25, 1990, now U.S. Pat. No. 5,102,643. The entire disclosures of these applications are expressly incorporated herein by reference.

BACKGROUND

Described herein is a method for preparing an ultra-large pore aluminosilicate oxide material.

LIQUID CRYSTALS, AMPHIPHILES, MICELLES, LYOTROPIC PHASES

Amphiphilic compounds, also referred to as amphiphiles, surface-active agents or surfactants, are composed of molecules which contain both at least one polar or hydrophilic "head" group and at least one non-polar or hydrophobic "tail". In aqueous solution, amphiphilic compounds may associate with each other to form structures known as micelles. These micelles are most often spherical structures in which the polar head groups form the outer surface and the non-polar tails form the inner portion or core of the sphere. Micelles are stable colloidal aggregates which are formed by amphiphiles above a specific concentration, which is called the critical micelle concentration or "CMC". Amphiphiles often have the further ability to arrange into various other, energetically favorable, ordered structures (e.g., liquid crystalline phases) in solution in response to certain stimuli. These stimuli include concentration of the amphiphile, temperature, pressure, ionic composition of solution, presence of organic or inorganic species in solution, etc.

The head group of an amphiphile may bear a positive or negative charge. Anionic amphiphilic compounds have a hydrophilic head group which bears a negative charge; a typical anionic amphiphilic compound is R—O—$SO_3$—, in which R represents a hydrocarbon chain, the hydrophobic "tail" group. The negative charge associated with the anionic head group is usually balanced by a small cation, such as H+, Na+, K+ or $NH_4$+. Cationic amphiphilic compounds have a hydrophilic head group which bears a positive charge; a typical cationic amphiphilic compound is $R(CH_3)_3N$+ where R again represents a hydrocarbon chain (the tail group). The positive charge associated with the cationic head group is usually balanced by a small anion, such as OH—, Cl—, Br— or $SO_4$=. The length of the chain (R) is critical to the function of an amphiphilic species, as, in aqueous solution, hydrocarbon chain lengths below 6 carbons do not energetically favor aggregation to form micellar phases, and carbon chain lengths above 36 carbons do not exhibit sufficient solubility to achieve CMC status. There exist other amphiphilic compounds, some bearing no net charge, that produce liquid crystal phases in solution. These include the general classes of nonionic and zwitterionic surfactants. An exhaustive review of this chemistry is found in a review article by Winsor (*Chemical Reviews*, 68(1), 1968).

Liquid crystals are materials which exhibit aspects of both the crystalline solid and amorphous liquid state. They resemble liquids in their ability to flow, and solids in the degree of order within their structure. In many systems, this order is established spontaneously. In other cases, it can be brought about, or controlled, by electric, magnetic, or hydrodynamic fields. Lyotropic liquid crystals comprise a large body of known liquid crystalline systems. These lyotropic systems are often comprised of two components: a solvent (e.g, water) and an amphiphilic compound. In many cases, however, additional components such as salts or other inorganic or organic compounds may be present in a lyotropic system. Such solvent-containing systems are often referred to as solutions, although it will be understood that such solutions are not true molecular solutions insofar as amphiphilic compounds are present as micellar aggregates as opposed to individual molecular species.

HEXAGONAL, CUBIC AND LAMELLAR PHASES

Liquid crystal/micellar aggregates may exhibit various structures. For example, three well known phases of lyotropic liquid crytals are the hexagonal, cubic and lamellar phases. The presence of these phases in a micellar solution containing amphiphilic compounds will be determined by a large number of factors including the concentration of the amphiphile, the presence of ions, other organic or inorganic molecules, temperature, etc. The existence of such phases in micellar solutions containing amphiphilic species are determined by a variety of techniques including, for example, X-ray diffraction techniques. X-ray diffraction and other studies of the hexagonal phase provide evidence that the amphiphilic species contained therein are arranged into rodlike micelles, or clusters, of indefinite length, and that these rods are stacked in a hexagonal array, e.g., each rod is surrounded by six nearest neighbors. Thus, liquid crystalline medium may be fashioned so as to contain the amphiphilic species packed in a hexagonal array.

Lamellar liquid crystalline phases are distinctly different from hexagonal phases in that the amphiphilic molecules do not form hexagonally packed rods, but instead arrange as sheets composed of bilayers of amphiphilic molecules separated from each other by intervening water layers. The amphiphilic molecules within each lamella may be oriented perpendicular to the plane of the lamella, or tilted. For comparable surfactants, lamellar phases are usually found at higher surfactant concentration than are hexagonal phases.

Another liquid crystalline phase is the cubic phase. Such phases are sometimes formed at concentrations of amphiphile intermediate betweeen those producing the lamellar phase and the hexagonal phase. Optical observations of the cubic phases only reveal that the structure is isotropic. X-ray diffraction studies have shown that these structures may be characterized as face-centered or body-centered cubic, although the detailed structure remains uncertain. It has often been argued, however, that these structures are bicontinuous. A particular type of cubic phase observed for liquid crystalline phases is known as Ia3d.

MICELLAR SOLUBILIZATION

Liquid crystal systems, in certain of their phases, exhibit properties which may be probed by various experimental means. For example, amphiphilic species which aggregate as micelles exhibit an important property known as micellar solubilization. The ability of micelles to solubilize non-polar organic species and thus "swell" to larger proportions is critically important to an amphiphilic species' role in common detergent formulations. This ability is discussed in detail in the aforementioned review article by Winsor.

SURFACTANT CHAIN LENGTH

A factor concerning the ability of amphiphilic compounds to form micelles concerns is the "Critical Micelle Concentration" or "CMC". The CMC is a measure of the aqueous concentration of surfactant at which micelles first begin to appear. A very extensive tabulation of CMC data has been compiled by Mukerjee and Mysels, "Critical Micelle Concentrations of Aqueous Surfactant Systems", National Standard Data Reference Service, NSDR 50-NBS 36, National Bureau of Standards, USA. Typical CMC's of alkyltrimethylammonium bromide salts range from $10^{-1}$M to $10^{-2}$M for $C_6$, $C_8$ salts, to $10^{-4}$M for $C_{16}$ salts.

It is well known in the surfactant literature that the diameter of micelles is, among other factors, controlled by the chain length of the amphiphilic species from which they are formed. Micelle formation with smaller alkyl chain length quaternaries such as $C_6$, and under most conditions $C_8$, is generally an energetically unfavorable event. The solubilities of these short chain quaternaries are quite high (>50 wt. % in water is achievable) and micellar structures are not necessary to minimize hydrophobic interactions.

SOLID CRYSTALLINE OXIDES

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. The pore systems of other zeolites lack cavities, and these systems consist essentially of unidimensional channels which extend throughout the crystal lattice. Since the dimensions of zeolite pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and, optionally, Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicates of varying alumina and metal content.

Aluminum phosphates are taught in U.S. Pat. Nos. 4,310,440 and 4,385,994, for example. These aluminum phosphate materials have essentially electroneutral lattices. These lattices may be described in terms of alternating $AlO_4$ and $PO_4$ tetrahedra. An example of such an aluminum phosphate is a material designated as $AlPO_4$-5.

Details of the structure of $AlPO_4$-5 are given by Meier and Olson in *Atlas of Zeolite Structure Types*, 2nd rev. ed. (1987), published on behalf of the Structure Commission of the International Zeolite Association by Butterworths. More particularly, Meier and Olson indicate that $AlPO_4$-5, also designated as AFI, is a material having pore windows formed by 12 tetrahedral members, these windows being about 7.3 Angstroms in diameter.

Of the siliceous zeolites discussed hereinabove, zeolites X and Y have the largest pore diameter and overall pore volume. Zeolites X and Y are synthetic analogues of the naturally ocurring zeolite, faujasite. Details of the structure of faujasite are also given by Meier and Olson, ibid. More particularly, Meier and Olson indicate that faujasite, also designated as FAU, is a material having pore windows formed by 12 tetrahedral members, these windows being about 7.4 Angstroms in diameter. For the purposes of the present disclosure, the terms, siliceous zeolite and siliceous oxide, are defined as materials wherein at least 50 mole percent of the oxides thereof, as determined by elemental analysis, are silica. The pore volume of faujasite is believed to be about 0.26 cc/g.

An oxide material with even larger pores than faujasite and $AlPO_4$-5 is a material designated as VPI-5. The structure of VPI-5 is described by Davis et al in an article entitled, "VPI-5: The first molecular sieve with pores larger than 10 Angstroms", *Zeolites*, Vol. 8, pp. 362-366 (1988). As indicated by Davies et al, VPI-5 has pore windows formed by 18 tetrahedral members of about 12-13 Angstroms in diameter. A material having the same structure as VPI-5 is designated MCM-9 and is described in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356-358 (1983) to have a framework structure containing very large channels with a calculated free pore diameter of 14.2 Angstroms. R. Szostak et al., *Zeolites: Facts, Figures, Future*, Elsevier Science Publishers B. V. (1989), present work showing cacoxenite as being very hydrophilic, i.e. adsorbing non-polar hydrocarbons only with great difficulty. Their work also shows that thermal treatment of cacoxenite causes an overall decline in X-ray peak intensity.

In layered (i.e. lamellar) materials, the interatomic bonding in two directions of the crystalline lattice is substantially different from that in the third direction, resulting in a structure that contains cohesive units resembling sheets. Usually, the bonding between the atoms within these sheets is highly covalent, while adjacent layers are held together by ionic forces or van der Waals interactions. These latter forces can frequently be neutralized by relatively modest chemical means, while the bonding between atoms within the layers remains intact and unaffected.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include trititanates, perovskites and layered silicates, such as magadiite and kenyaite. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090 and 4,367,163; and European Patent Application 205,711.

TEMPLATING

In an article by Lok et al., entitled "The Role of Organic Molecules in Molecular Sieve Synthesis", appearing in *Zeolites*, Vol. 3, pp. 282-291 (1983), the so-called "templating theory" of molecular sieve synthesis is discussed. According to this theory, individual organic molecular species, such as individual quaternary ammonium ions, may serve as templates about which portions of channels or cages of molecular sieves may form. Although organic molecules would also appear to direct or help the synthesis of certain molecular sieves, such as zeolites and crystalline aluminum phosphates, by influencing the gel chemistry of the reaction mixture, the structures of a number of molecular sieves are consistent with structures derived from reaction mixtures where individual quaternary ammonium ions serve as templates for framework formation.

In most instances, the quaternary ammonium compounds used to synthesize zeolitic molecular sieves do not contain the appropriate features to function as amphiphilic species. Typically, the chain length (R), the "tail" group, is less than six carbons. Therefore, liquid crystal chemistry is not favored in typical zeolite syntheses.

SUMMARY

There is provided a method for synthesizing a composition of matter comprising an inorganic, porous, non-layered crystalline phase material exhibiting, after calcination, an X-ray diffraction pattern with at least one peak at a d-spacing greater than about 18 Angstrom Units with a relative intensity of 100 and a benzene adsorption capacity of greater than 15 grams benzene per 100 grams of said material at 50 torr and 25° C., said method comprising the steps of:

(a) preparing a mixture capable of forming said composition, said mixture comprising a source of silica, a source of alumina, an organic (R') agent and a solvent or solvent mixture, wherein R' comprises an ion of the formula $R_1R_2R_3R_4Q^+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof;

(b) maintaining said mixture under sufficient conditions of pH, temperature and time for formation of said composition of matter; and (c) recovering said composition of matter, wherein said source of silica and said source of alumina comprise hydrolyzable compounds which hydrolyze under the conditions of step (b) to give silica and alumina.

The materials prepared by processes described herein may have pore sizes of at least 13 Angstroms, e.g., at least 15 or even at least 20 Angstroms. These materials may be non-lamellar. Examples of such non-lamellar forms include hexagonal and cubic. The only reasonable explanation for the formation of these materials is by a mechanism involving templating from liquid crystals in the reaction mixture. These liquid crystals may be formed during the initial formation of the reaction mixture or at some later stage of the reaction, while the reaction mixture is being subjected to reaction conditions.

EMBODIMENTS

The methodology and procedures herein describe the synthesis of a new class of crystalline oxide materials which are formed by the use of the broad range of amphiphilic compounds with particular emphasis on cationic amphiphiles. These compounds serve as liquid crystal templates in directing the formation of these new species. In a general context the invention involves the formation of highly-ordered inorganic oxide structures in any medium wherein the inorganic oxide structure that forms is defined by the solvent domains (e.g., aqueous domains) in the liquid crystalline structures. Optionally, the organic amphiphile may be removed by washing and drying, or by calcination in air, which then leaves a porous inorganic material with highly uniform, accessible pores.

The pore diameters of mesoporous, inorganic phases of this invention may also be altered by the addition of auxiliary organics to the reaction mixture. A variety of organic molecules of varying polarity may serve as auxiliary organic swelling agents in the preparation of the mesoporous materials. A variety of nonpolar organics, such as alkylated aromatics and straight or branched chain hydrocarbons are effective in increasing the pore dimension of these materials. Agents which produce swelled versions of the hexagonal phase as determined from X-ray powder diffraction patterns (3-4 peaks related by hexagonal constraints) are generally nonpolar aromatics possessing short aliphatic chains. Straight and branched chain hydrocarbons in the $C_5-C_{12}$ range are also effective in increasing pore size; however, the products often exhibit an apparent mixture of phases. Polar organic species, including alcohols, aldehydes, ketones and ethers, were found to be ineffective in increasing pore size of these materials, and in several cases, were found to disrupt the synthesis resulting in the isolation of completely amorphous materials. These results support a swelling mechanism in which the auxiliary organic is solubilized by surfactant micelles. Organics which are non-polar and thus hydrophobic are susceptible to solubilization in the micellar interior and are found to be effective swelling agents. Those organics which have considerable polar character are insoluble in the micelles interior and are therefore incapable of micellar swelling. These species produce no increase in pore dimension of the resulting products. These results are consistent with established principles concerning the concept of organic solubilization in micellar systems.

Although the reaction mixtures of the present invention contain several other chemical components/phases/ions which will affect the CMC, the overall surfactant concentrations (surfactant:total water) are always well above the CMC. Thus, in the present invention, a variety of amphiphile types have been employed as liquid crystal templates in the formation of novel mesoporous materials. Furthermore, alteration of even one type of amphiphile may lead to the formation of varied pore dimension.

In the preparation of mesoporous phases described herein, the amphiphile chain length is reflected in the nature of the final product. The effect of chain length variation of alkyltrimethylammonium amphiphile cations used in the synthesis of the present mesoporous materials is clearly demonstrated by the variation in pore diameter of the final products. A range of pore sizes for the hexagonal materials is possible based on the carbon chain length. For example, the hexagonal phase of the mesoporous material may be prepared with alkyltrimethylammonium surfactant cations of carbon chain length $C_9-C_{16}$, and these materials will exhibit pore sizes increasing with increasing carbon chain length.

The exploitation of the properties of amphiphilic compounds and their aggregated micellar forms in the formation of a variety of new inorganic oxide phases is described herein. In addition, a more general concept involves the formation of inorganic oxide structures formed from any aqueous or non-aqueous liquid crystal-containing medium. Another example of a novel liquid crystal synthesis system is the formation of inorganic oxide structures from reverse micelle systems. In these systems, at high amphiphile concentration, the liquid crystal template might be the water phase with the inorganic structure forming in the "oil" phase.

The oxide materials described herein may be inorganic, porous materials having a pore size of at least about 13 Angstroms. More particularly, the pore size of the present materials may be within the range of from about 13 Angstroms to about 200 Angstroms. Certain of these novel oxide compositions may exhibit a hexagonal electron diffraction pattern that can be indexed with a $d_{100}$ value greater than about 18 Angstroms, and a benzene adsorption capacity of greater than about 15 grams benzene/100 grams crystal at 50 torr and 25° C. Certain of these oxide materials may have a hexagonal arrangement of uniformly sized pores.

As demonstrated hereinafter, the inorganic, oxide material described herein may have a silica/alumina molar ratio of greater than 5.

To the extent desired, the original ions of the as-synthesized material described herein can be replaced in accordance with techniques well known in the art, at least in part, by ion exchange with other ions. Examples of such replacing ions include metal ions, hydrogen ions, hydrogen precursor, e.g. ammonium, ions and mixtures thereof. Particular examples of such ions are those which tailor the catalytic activity for certain hydrocarbon conversion reactions. Replacing ions include hydrogen, rare earth metals and metals of Groups IA (e.g. K), IIA (e.g. Ca), VIIA (e.g. Mn), VIIIA (e.g. Ni), IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

Certain of the oxide materials described herein may be readily identified as crystalline materials. The term "crystalline" is meant herein as having sufficient order to produce at least one peak in a diffraction pattern from electromagnetic radiation or particle beams. These crystalline materials may have a diffraction pattern produced, for example, by X-ray, electron or neutron diffraction. These crystalline materials may have sufficient thermal stability to retain the crystallinity thereof after being subjected to calcination conditions to remove organic material from the as-synthesized forms thereof.

Certain of the oxide materials described herein may be readily identified as mesoporous materials. These mesoporous materials may have extremely large pore windows, and high sorption capacity. The term "mesoporous" is used here to indicate materials having pores within the range of from about 13 Angstroms to about 200 Angstroms. The materials described herein may have uniform pores within the range of from about 13 Angstroms to about 200 Angstroms, more usually from about 15 Angstroms to about 100 Angstroms. For the purposes of this disclosure, a working definition of "porous" is a material that adsorbs at least 1 gram of a small molecule, such as Ar, $N_2$, n-hexane or cyclohexane, per 100 grams of the solid.

Certain of the porous oxide materials described herein can be distinguished from other porous inorganic solids by the regularity of their large open pores, whose pore size is greater than that of microporous zeolites, but whose regular arrangement and uniformity of size (pore size distribution within a single phase of, for example, ±25%, usually ±15% or less of the average pore size of that phase) resemble those of zeolites.

Certain forms of the present materials may give rise to characteristic X-ray diffraction patterns, which serve to identify these materials as hexagonal or cubic, as well as to distinguish these materials from lamellar materials or other materials such as known microporous zeolites, layered materials, pillared materials and amorphous materials. Such patterns may have at least two peaks. The positions of these peaks vary with changes in the pore diameters of the materials, but the ratios of d-spacings of those peaks will remain fixed. Using $d_1$ to indicate the d-spacing of the strongest peak in the X-ray diffraction pattern (relative intensity=100), the X-ray diffraction pattern of certain materials produced using amphiphilic compounds exhibit $d_1$ at a position greater than about 18 Angstroms d-spacing and at least one additional weaker peak with d-spacing $d_2$ such that the ratios of these d-spacings relative to $d_1$ correspond to the ranges given in X-ray diffraction pattern Tables set forth hereinafter.

The hexagonal form of the present material (hereinafter also referred to as MCM-41) may have an X-ray diffraction pattern with one or more peaks. If only one peak is observed in this pattern, it may be necessary to employ more sensitive techniques, such as electron diffraction by TEM as described hereinafter, in order to confirm the hexagonal symmetry of MCM-41.

X-ray patterns of MCM-41 having 2 or more peaks may have the values given in Table 1.

TABLE 1

| d-spacing Angstroms | $d_n/d_1$ | Relative Intensity |
|---|---|---|
| $d_1 \gtrsim \sim 18$ | 1.0 | 100 |
| $d_2$ | 0.58 ± 0.06 | W |

X-ray patterns of MCM-41 having 3 or more peaks may have the values given in Table 2.

TABLE 2

| d-spacing Angstroms | $d_n/d_1$ | Relative Intensity |
|---|---|---|
| $d_1 \gtrsim \sim 18$ | 1.0 | 100 |
| $d_2$ | 0.58 ± 0.06 | W |
| $d_3$ | 0.50 ± 0.02 | W |

X-ray patterns of MCM-41 having 4 or more peaks may have the values given in Table 3.

TABLE 3

| d-spacing Angstroms | $d_n/d_1$ | Relative Intensity |
|---|---|---|
| $d_1 \gtrsim \sim 18$ | 1.0 | 100 |
| $d_2$ | 0.58 ± 0.06 | W |
| $d_3$ | 0.50 ± 0.02 | W |
| $d_4$ | 0.38 ± 0.02 | W |

The most regular preparations of the hexagonal form of the present mesoporous material give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the present material in them. Other techniques to illustrate the microstructure of this material are transmission electron microscopy and electron diffraction. Properly oriented specimens of the hexagonal form of the present material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $d_{100} = a_0\sqrt{3}/2$. This $d_{100}$ spacing observed in the electron diffraction patterns corresponds to the d-spacing of a low angle peak in the X-ray diffraction pattern of the material. The most highly ordered preparations of MCM-41 obtained so far have 20–40 distinct spots observable in the electron diffraction patterns. These patterns can be indexed with the hexagonal hk0 subset of unique reflections of 100, 110, 200, 210, etc., and their symmetry-related reflections.

In its calcined form, the crystalline mesoporous material described herein may have an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

Certain of the calcined crystalline non-layered materials described herein may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. The X-ray diffraction pattern of calcined materials described herein may have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Certain forms of this material appear to have a hexagonal arrangement of large open channels that can be synthesized with open internal diameters from about 13 Angstroms to about 200 Angstroms. These forms are referred to herein as hexagonal forms. The term "hexagonal" is intended to encompass not only materials that exhibit mathematically perfect hexagonal symmetry within the limits of experimental measurement, but also those with significant observable deviations from that ideal state. A working definition as applied to the microstructure of the hexagonal form of the present mesoporous material would be that most channels in the material would be surrounded by six nearest neighbor channels at roughly the same distance. Defects and imperfections may cause significant numbers of channels to violate this criterion to varying degrees, depending on the quality of the material's preparation. Samples which exhibit as much as ±25% random deviation from the average repeat distance between adjacent channels still clearly give recognizable images of the hexagonal form of the present ultra-large pore materials. Comparable variations are also observed in the $d_{100}$ values from the electron diffraction patterns.

To illustrate the nature of the mesoporous material described herein, samples of these materials may be studied by transmission electron microscopy (TEM). TEM is a technique used to reveal the microscopic structure of materials, including crystalline materials.

In order to illuminate the microstructure of materials by TEM, samples must be thin enough for an electron beam to pass through them, generally about 500-1000 Angstrom units or so thick. When the crystals of the present materials are too thick, they should be prepared for study by ultramicrotomy. While time consuming, this technique of sample preparation is quite familiar to those skilled in the art of electron microscopy. The materials may be embedded in a resin, e.g., a commercially available low viscosity acrylic resin L. R. WHITE (hard), which is then cured at about 80° C. for about 1½ hours. Thin sections of the block may be cut on an ultramicrotome using a diamond knife and sections in the thickness range 500-1000 Angstrom units may be collected on fine mesh electron microscope support grids. An LKB model microtome with a 45° C. diamond knife edge may be used; the support grids may be 400 mesh copper grids. After evaporation of a thin carbon coating on the sample to prevent charging in the microscope (light gray color on a white sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDP's are readily produced on modern TEM instruments using, e.g., the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

In order to observe the salient features of the hexagonal form of the present mesoporous material, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. The number of diffraction spots observed depends to a degree upon the regularity of the crystalline arrangement in the material, among other things. At the very least, however, the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located.

Microtomed samples of materials may be examined by the techniques described above in a JEOL 200 CX transmission electron microscope operated at 200,000 volts with an effective 2 Angstrom objective aperture in place. The instrument has a point-to-point resolution of 4.5 Angstroms. Other experimental arrangements familiar to one skilled in the art of high resolution (phase contrast) TEM could be used to produce equivalent images provided care is taken to keep the objective lens on the underfocus (weak lens) side of the minimum contrast lens current setting.

The application of the above-mentioned TEM techniques to particular samples is described in Example 23 of the aforementioned U.S. application Ser. No. 625,245, filed Dec. 10, 1990 now U.S. Pat. No. 5,098,684.

X-ray patterns of the cubic form of the present material (hereinafter also referred to as MCM-48) having 2 or more peaks may have the values given in Table 4.

TABLE 4

| d-spacing Angstroms | $d_n/d_1$ | Relative Intensity |
| --- | --- | --- |
| $d_1 \geq \sim 18$ | 1.0 | 100 |
| $d_2$ | 0.87 ± 0.06 | W-M |

X-ray patterns of MCM-48 having 3 or more peaks may have the values given in Table 5.

TABLE 5

| d-spacing Angstroms | $d_n/d_1$ | Relative Intensity |
| --- | --- | --- |
| $d_1 \geq \sim 18$ | 1.0 | 100 |
| $d_2$ | 0.87 ± 0.06 | W-M |
| $d_3$ | 0.52 ± 0.04 | W |

X-ray patterns of MCM-48 having 5 or more peaks may have the values given in Table 6.

TABLE 6

| d-spacing Angstroms | $d_n/d_1$ | Relative Intensity |
| --- | --- | --- |
| $d_1 \geq \sim 18$ | 1.0 | 100 |
| $d_2$ | 0.87 ± 0.06 | W-M |
| $d_3$ | 0.55 ± 0.02 | W |
| $d_4$ | 0.52 ± 0.01 | W |
| $d_5$ | 0.50 ± 0.01 | W |

If the reaction mixture has a composition outside the scope of the present invention, a lamellar form of an oxide material may be produced. X-ray patterns of this lamellar form of the material having 2 or more peaks may have the values given in Table 7.

TABLE 7

| d-spacing Angstroms | $d_n/d_1$ | Relative Intensity |
| --- | --- | --- |
| $d_1 \geq \sim 18$ | 1.0 | 100 |
| $d_2$ | 0.50 ± 0.06 | W |

X-ray patterns of this lamellar material having 3 or more peaks may have the values given in Table 8.

TABLE 8

| d-spacing Angstroms | $d_n/d_1$ | Relative Intensity |
| --- | --- | --- |
| $d_1 \geq \sim 18$ | 1.0 | 100 |
| $d_2$ | 0.50 ± 0.06 | W |
| $d_3$ | 0.33 ± 0.06 | W |

X-ray patterns of this lamellar material having 4 or more peaks may have the values given in Table 9.

TABLE 9

| d-spacing Angstroms | $d_n/d_1$ | Relative Intensity |
|---|---|---|
| $d_1 \gtrsim \sim 18$ | 1.0 | 100 |
| $d_2$ | $0.50 \pm 0.06$ | W |
| $d_3$ | $0.33 \pm 0.06$ | W |
| $d_4$ | $0.25 \pm 0.06$ | W |

The X-ray diffraction pattern for the lamellar material has no peaks at positions above 10 degrees 2 theta with an intensity above 10% of the strongest peak.

Most forms of MCM-41 and MCM-48 are quite thermally stable. For example, the as-synthesized forms of these materials may be subjected to calcination sufficient to remove organics, e.g., occluded surfactants from the reaction mixtures, without measurably degrading the crystallinity of the materials, as noted by changes in the X-ray diffraction patterns of the calcined materials in comparison with the X-ray diffraction patterns of the as-synthesized materials. It should be noted, however, that the presence or absence of organic material within the channels of the porous material will substantially affect the relative intensities of the peaks listed in the Tables, particularly resulting in enhanced relative intensities of the shorter d-spacing peaks. The ratios of d-spacings $d_n/d_1$, however, will not be substantially affected. These calcination conditions may include calcination of the as-synthesized material in nitrogen at 540° C. for one hour, followed by calcination in air at 540° C. for 6 hours. The above-mentioned X-ray diffraction pattern Tables for MCM-41 and MCM-48 were mostly derived from the calcined forms of these materials, which were calcined under the above-mentioned conditions including a temperature of 540° C. Accordingly, these X-ray diffraction pattern Tables especially pertain to forms of MCM-41 and MCM-48, which are calcined one or more times under these conditions. However, it will be understood that the d-spacing ratios $d_n/d_1$ in these X-ray diffraction pattern Tables also pertain to other forms of MCM-41 and MCM-48, including as-synthesized forms or other forms, such as where occluded surfactant from the reaction mixture has been totally or partially removed by other treatments, such as calcination under different conditions, washing with an appropriate solvent, ion exchange or combinations of such treatments. Material in the channels of these materials may affect the relative intensities of the peaks in the Tables.

Certain as-synthesized forms of MCM-41 and MCM-48 may not be sufficiently thermally stable to withstand calcination conditions without undergoing substantial degradation in crystallinity and/or porosity. However, certain thermally unstable, as-synthesized forms of MCM-41 and MCM-48 may be stabilized by a stabilization treatment disclosed in copending U.S. application Ser. No. 718,505, filed Jun. 20, 1991, now U.S. Pat. No. 5,156,829 the entire disclosure of which is expressly incorporated herein by reference. This stabilization treatment involves contacting the material with a compound of the formula

where M' is boron, aluminum, silicon or titanium; X' represents alkyl halides having from 1–6 carbon atoms and/or alkoxides having 1–6 carbon atoms; Y' represents X and/or alkyls with 1–12 carbon atoms; and n=1–2. Examples of compounds of the formula $M'X'_2Y'_n$ are tetraethylorthosilicate, tetramethylorthosilicate, titanium tetraethoxide, aluminum tri-sec-butoxide and aluminum tri-iso-butoxide. The treatment mixture containing crystalline material and $M'X'_2Y'_n$ may also include solvents as are known in the art, preferably organic solvents such as alcohols and diols having 1 to 6 carbon atoms ($C_{1-6}$). The ratio of crystalline material to treatment compound may vary within wide limits, e.g., from about 1:100 to about 100:1. The temperature at which the treatment method may be carried out is limited, as a practical matter, only by the freezing or boiling point (including the boiling point under pressure) of the treatment mixture, and the time of contacting is not critical and may be, for example, from about 1 to about 24 hours, preferably from about 1 to about 12 hours. After treatment, the treated product is preferably calcined, preferably in the presence of oxygen, under conditions sufficient to convert the compound to an oxide of M'.

Without being bound by any theory, it is theorized that this stabilization treatment of MCM-41 and MCM-48 results in the insertion of additional matter into the pore walls, thereby resulting in stronger, more stable pore walls. It will be understood that the above-mentioned X-ray diffraction pattern Tables for MCM-41 and MCM-48 represent forms of MCM-41 and MCM-48, which have been subjected to stabilization treatments, such as those disclosed in the aforementioned Ser. No. 718,505.

The calcined inorganic, crystalline material described herein may have a pore size of about 13 Angstroms or greater as measured by physisorption measurements, hereinafter more particularly set forth. It will be understood that pore size refers to the diameter of the pore. The pores of the present hexagonal form of these materials are believed to be essentially cylindrical.

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the mesoporous crystal described herein.

The following description provides examples of how physisorption measurements, particularly argon physisorption measurements, may be taken. Examples 22(a) and 22(b) of the aforementioned U.S. application Ser. No. 625,245, filed Dec. 10, 1990, now U.S. Pat. No. 5,098,684 provide demonstrations of these measurements as applied to particular samples.

To determine the pore diameters of products with pores up to about 60 Angstroms in diameter, 0.2 gram samples of the products may be placed in glass sample tubes and attached to a physisorption apparatus as described in U.S. Pat. No. 4,762,010, which is incorporated herein by reference.

The samples may be heated to 300° C. for 3 hours in vacuo to remove adsorbed water. Thereafter, the samples may be cooled to 87° K. by immersion of the sample tubes in liquid argon. Metered amounts of gaseous argon may then be admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes may be used. (See also S. J. Gregg et al., *Adsorption, Surface Area and Porosity*, 2nd ed., Academic Press, (1982)). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure $P_o$ of the adsorbate at the temperature where the isotherm is measured. Sufficiently small amounts of argon may be admitted in each step to generate, e.g., 168 data points in the relative pressure range from 0 to 0.6. At least about 100 points are required to define the isotherm with sufficient detail.

The step (inflection) in the isotherm indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log ($P/P_o$) is formed. The position of an adsorption peak in terms of log ($P/P_o$) may be converted to the physical pore diameter in Angstroms by using the following formula:

$$\log(P/P_o) = \frac{K}{d - 0.38} \left( \frac{S^4}{3(L - D/2)^3} - \frac{S^{10}}{9(L - D/2)^9} - \frac{S^4}{3(D/2)^3} + \frac{S^{10}}{9(D/2)^9} \right)$$

wherein d=pore diameter in nanometers, K=32.17, S=0.2446, L=d+0.19, and D=0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of AlPO$_4$-5 and its known pore size. This method is particularly useful for porous materials having pores of up to about 60 Angstroms in diameter.

For materials having a pore size greater than 9 Angstroms, the plot of log ($P/P_o$) vs. the derivative of uptake may reveal more than one peak. More particularly, a peak may be observed at $P/P_o$=0.0027. This peak reflects adsorption on the walls of the pores and is not otherwise indicative of the size of the pores of a given material.

A material with pore size of 39.6 Angstroms has a peak occurring at log ($P/P_o$)=−0.4 or $P/P_o$=0.4. A value of $P/P_o$ of 0.03 corresponds to 13 Angstroms pore size.

The above method of Horvath and Kawazoe for determining pore size from physisorption isotherms was intended to be applied to pore systems of up to 20 Angstroms diameter; but with some care as above detailed, its use can be extended to pores of up to 60 Angstroms diameter, as described above.

In the pore regime above 60 Angstroms diameter, however, the Kelvin equation can be applied. It is usually given as:

$$\ln(P/P_0) = \frac{-2\lambda V}{r_k RT} \cos \theta$$

where:
- λ=surface tension of sorbate
- V=molar volume of sorbate
- θ=contact angle (usually taken for practical reasons to be 0)
- R=gas constant
- T=absolute temperature
- $r_k$=capillary condensate (pore) radius
- $P/P_o$=relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstroms diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

Non-lamellar forms of materials described herein, such as MCM-48 and, especially, MCM-41, may be distinguished from other oxide materials in terms of their pore sizes and the uniformity of their pore systems. A distinctive feature of certain forms of MCM-41 and MCM-48 is that these materials are (1) non-lamellar (e.g., non-layered or non-pillared), (2) have pore sizes over 13 Angstroms (e.g., over 15 Angstroms, even over 20 Angstroms), and (3) have an X-ray diffraction pattern with at least one peak, e.g., at a d-spacing of at least about 18 Angstroms.

Another indication of the uniformity of pore systems in these materials is apparent from the physisorption characteristics of these materials. More particularly, the plots of log ($P/P_o$) vs. the derivative of uptake may reveal sharp peaks not observed for other large-pore materials, such as amorphous materials and pillared, layered materials.

Another distinctive feature of materials described herein, especially MCM-41 and MCM-48, is the extremely large surface areas of these materials. More particularly, certain forms of MCM-41 and MCM-48 may have surface areas over 800 m$^2$/g. Especially distinct forms of these materials with high surface areas include those with especially large pore sizes (e.g., greater than 20 Angstroms or 30 Angstroms), particularly those materials which are observed to have uniform pore size distributions.

A further distinctive feature of materials described herein, especially MCM-41 and MCM-48, is the large pore volumes of these materials. One indication of the pore volumes of these materials is their benzene sorption capacity. Pore volumes may also be measured by physisorption measurements. Such measurements of certain forms of materials described herein, such as forms of MCM-41 and MCM-48 may reveal pore volumes of greater than 0.40 cc/g.

As mentioned hereinabove the large pore sizes of materials described herein may be confirmed by physisorption measurements, especially argon physisorption measurements. Another indication of large pore sizes of materials described herein may be provided by determining their ability to sorb large probe molecules, such as molecules having kinetic diameters of at least 8.5 Angstroms, e.g., 1,3,5-triisopropylbenzene.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The mesoporous materials described herein that have the largest pore sizes may require more highly collimated incident X-ray beams in order to resolve the low angle peak from the transmitted incident X-ray beam.

The diffraction data were recorded by step-scanning at 0.04 or less degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75-100), s=strong (50-74), m=medium (25-49) and w=weak (0-24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity may be determined by contacting the crystalline material described herein, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When used as a catalyst component, the crystalline material described herein should be subjected to treatment to remove part or all of any organic constituent. The present composition can also be used as a catalyst component (e.g., a support) in intimate combination with a hydrogenating component such as a metal, particularly a transition metal, especially tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the material with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material described herein, when employed either as a support or a catalyst in an organic compound conversion process may be dehydrated, at least partially. This dehydration can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The reaction mixture for preparing crystalline materials described herein may comprise a source of one or more oxides, an amphiphilic compound and a solvent or solvent mixture. This amphiphilic compound is also referred to herein as the primary organic agent (R') and is more particularly described hereinafter. The solvent or solvent mixture may comprise, for example, $C_1$-$C_6$ alcohols, $C_1$-$C_6$ diols and/or water, especially water. Optional components of the reaction mixture include (1) a source of alkali or alkaline earth metal (M), e.g. sodium or potassium, cations, (2) an additional organic agent (R"), hereinafter more particular described, and (3) an organic swelling agent, also referred to herein as an auxiliary organic agent (R'''), hereinafter more particularly described.

The reaction mixture may have the mole ratio

Solvent/(R'$_2$O+M$_2$O)

of at least 45. When R' is cetyltrimethylammonium and this ratio is 10–45, the formation of the above-mentioned lamellar phase is favored. When R' is cetyltrimethylammonium and this ratio is 45–92, the formation of the above-mentioned cubic phase (MCM-48) is favored. When R' is cetyltrimethylammonium and this ratio is greater than 92, e.g., 92–300, the formation of the above-mentioned hexagonal phase (MCM-41) is favored. It will be understood that mixtures of these phases may be produced near the transition values of these ratios. For example, mixtures of the hexagonal phase and the cubic phase may be produced at ratios of 92-100.

The reaction mixture may have the mole ratio $$(R'_2O + R''_2O)/(SiO_2 + Al_2O_3)$$

of 0.01-2.0, e.g., 0.03-1.0, e.g., 0.3-1.0, e.g., 0.3-0.6. This mole ratio is calculated on a basis wherein it is assumed that all of the hydrolyzable silicon and aluminum compounds in the reaction mixture are hydrolyzed. The pH of the reaction mixture may be from about 7 to 14, e.g., from about 9 to 14.

The components of the reaction mixture may be combined in any order. In some instances, it may be desired to combine the solvent and primary organic agent (R') prior to adding the source of oxide to this preformed mixture. Upon the formation of the reaction mixture, this mixture may, optionally, be subjected to an aging step at low temperature, e.g., from about 0° C. to about 50° C., for a short period of time, e.g., from about 30 minutes to about 2 hours. This aging step may take place in the presence of absence of agitaion of the reaction mixture.

Crystallization of the reaction mixture may take place at elevated temperature, e.g., from about 50° C. to about 200° C., e.g., from about 95° C. to about 150° C., for about 4 to about 72 hours, e.g., from about 16 to about 60 hours. The crysallization may take place under reflux conditions. The crystallization may also take place in the presence of microwave radiation under conditions specified in U.S. Pat. No. 4,778,666.

Particular methods for making MCM-41 are described in the aforementioned U.S. application Ser. No. 470,008, filed Jan. 25, 1990 now U.S. Pat. No. 5,102,643.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

Hydrolyzable sources of alumina include organic-containing sources of alumina, such as alkoxides and chelates. The organic moieties in such organic-containing sources of alumina may include, in part or in whole, alkoxide moieties. An example of such an organic-containing source of alumina is aluminum di(isopropoxide) acetoacetic ester chelate (Al-DPAA). When tetraethylorthosilicate (TEOS) is used as a source of silica and (Al-DPAA) is used as a source of alumina in the reaction mixture, particularly catalytically active forms of the present materials ma be formed. It is believed that (Al-DPAA) hydrolyzes at a comparable rate to TEOS under reaction conditions, thereby yielding a product containing an intimate mixture of alumina and silica. Other organic-containing sources of alumina and silica may be selected which hydrolyze at comparable rates.

By adjusting conditions of the synthesis reaction for each method, like temperature, pH and time of reaction, etc., within the above limits, embodiments of the present material with a desired degree of crystallinity or a desired average pore size may be prepared. In particular, changing the pH, the temperature or the reaction time may promote formation of product crystals with different average pore size.

A primary organic agent (R') for use in preparing the present reaction mixture is an ammonium or phosphonium ion of the formula $R_1R_2R_3R_4Q^+$, i.e.:

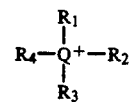

wherein Q is nitrogen or phosphorus and wherein at least one of $R_1$, $R_2$, $R_3$ and $R_4$ is aryl or alkyl of from 6 to about 36 carbon atoms, especially from 8 to 36 carbon atoms, e.g. $-C_{10}H_{21}$, $-C_{16}H_{33}$ and $-C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

An additional organic agent (R") may also be used. That additional organic agent may be the ammonium or phosphonium ion of the above primary organic agent formula wherein $R_1$, $R_2$, $R_3$ and $R_4$ together or separately are selected from the group consisting of hydrogen and alkyl of 1 to 5 carbon atoms and combinations thereof. Any such combination of organic agents may be in molar ratio of about 100/1 to about 0.01/1, first above listed organic agent/additional organic agent (R'/R").

Non-limiting examples of R' capable of forming micelles include cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidodecylammonium.

In addition to the above-mentioned primary organic agent (R') and the additional organic agent (R"), the reaction mixture may also contain an auxiliary organic agent (R'''). These auxiliary organic agents are compounds which are capable of swelling micelles. Such auxiliary organic agents may be selected from the group consisting of (1) aromatic hydrocarbons and amines having from 5 to 20 carbon atoms and halogen- and $C_1-C_{14}$ alkyl-substituted derivatives thereof, (2) cyclic aliphatic hydrocarbons and amines having from 5 to 20 carbon atoms and halogen- and $C_1-C_{14}$ alkyl-substituted derivatives thereof, (3) polycyclic aliphatic hydrocarbons and amines having from 6 to 20 carbon atoms and halogen- and $C_1-C_{14}$ alkyl-substituted derivatives thereof, (4) straight and branched aliphatic hydrocarbons and amines having from 3 to 16 carbon atoms and halogen-substituted derivatives thereof, and (5) combinations thereof.

In this group of auxiliary organic agents (R''') for use in the present method, the halogen substituent in substituted derivatives may be, for example, bromine. The $C_{1-14}$ alkyl substituent in the substituted derivatives may be linear or branched aliphatic chains, such as, for example, methyl, ethyl, propyl, isopropyl, butyl, pentyl and combinations thereof. Non-limiting examples of these auxiliary organic agents include, for example, p-xylene, trimethylbenzene, triethylbenzene and triisopropylbenzene. A particular example of such an auxiliary organic agent (R''') is 1,3,5-trimethylbenzene (i.e. mesitylene).

The mole ratio of the auxiliary organic agent to the primary organic agent (R'''/R') may be from about 0.02 to about 100, e.g., from about 0.05 to about 35.

Consistent with the ability of the auxiliary organic agent to swell micelles, the pore sizes of oxides prepared from reaction mixtures containing both auxiliary and primary organic agents have been observed to be substantially larger than the pore sizes of oxides prepared from reaction mixtures lacking auxiliary organic agents. When auxiliary organic agents are used in reaction mixtures, the pore sizes of oxide materials produced may be greater than 60 Angstroms.

The use of auxiliary organic agents in the preparation of MCM-41 is described in copending U.S. application Ser. No. 625,171, filed Dec. 10, 1990, now U.S. Pat. No. 5,057,296 the entire disclosure of which is expressly incorporated herein by reference.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The oxides prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The present compositions are useful as catalyst components for catalyzing the conversion of organic compounds, e.g. oxygenates and hydrocarbons, by acid-catalyzed reactions. The size of the pores may be such that the spatiospecific selectivity with respect to transition state species is minimized in reactions such as cracking (Chen et al., "Shape Selective Catalysis in Industrial Applications", 36 *Chemical Industries*, pgs. 41-61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g. molecular sizes of about 13 Angstroms or more. The present catalytic compositions are particuarly useful for reactions in which the molecular weight of the feed is reduced to a lower value, i.e. to reactions involving cracking such as cracking or hydrocracking. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr$^{-1}$ to about 100 hr$^{-1}$, with a hydrogen/hydrocarbon molar ratio of from about 0.1 to about 100.

The present catalytic compositions are especially useful for reactions using high molecular weight, high boiling or non-distillable feeds, especially residual feeds, i.e. feeds which are essentially non-distillable or feeds which have an initial boiling point (5% point) above about 1050° F. Residual feeds which may be used with the present catalytic compositions include feeds with API gravities below about 20, usually below 15 and typically from 5 to 10 with Conradsen Carbon Contents (CCR) of at least 1% by weight and more usually at least 5% or more, e.g. 5–10%. In some resid fractions the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g. phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic materials may also be utilized with feeds of non-petroleum origin, for example, synthetic oils produced by coal liquefaction, Fischer-Tropsch waxes and heavy fractions and other similar materials. Another example of a particular feed is shale oil.

As in the case of many catalysts, it may be desired to incorporate the new oxide composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix materials in colloidal form so as to facilitate extrusion of the bound catalyst components(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following Examples are presented. In the Examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition may exhibit an equilibrium benzene adsorption capacity at 50 Torr and 25° C. of greater than about 10 grams/100 grams, e.g., greater than about 12.5 g/100 g, e.g., greater than about 15 grams/100 grams, e.g., greater than about 17.5 g/100 g, e.g., greater than about 20 g/100 g, e.g., greater than about 30 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the Examples, percentages are by weight unless otherwise indicated.

EXAMPLE 1

75 ml of Al(iso-propoxide)$_2$acetoacetic ester chelate (Al-DPAA) and 160 ml of tetraethylorthosilicate were mixed to give a homogeneous solution. 60 ml of this solution was combined in a plastic bottle with 160 ml of a cetyltrimethylammonium (CTMA) hydroxide solution, prepared by contacting a 50 wt. % N,N,N-trimethyl-1-hexadecanaminium chloride solution in isopropanol/water (35/15) [Araquad 16/50, AKZO] with a hydroxide-for-halide exchange resin. After several hours the slurry was placed in a steambox with the container only partially closed with a screw cap to allow evaporation of alcohols released due to hydrolysis. The next day about 200 ml of water was added to the almost dry solid and the reaction continued in the steambox for 7 days (with interruptions for sampling). The slurry was filtered, washed with alcohol and dried in vacuum oven. Part of the solid was calcined in air at 500° C. The catalyst showed a low angle line in its X-ray powder diffraction pattern at about 27.6±2.0 Angstroms d-spacing and a benzene sorption of about 20%.

EXAMPLE 2

The procedure of Example 1 was followed. After 7 days reaction the pH was adjusted to 11.5 with a cetyltrimethylammonium (CTMA) hydroxide solution, prepared by contacting a 29 wt. % N,N,N-trimethyl-1-hexadecanaminium chloride solution with a hydroxide-for-halide exchange resin, and the slurry reacted an additional 24 hr at 130° C. The product was worked up as above. It showed higher stability and could be calcined at 540° C. Portions of the solid product were calcined at 500° C. or 540° C. The calcined material showed, in its X-ray powder diffraction pattern, a low angle line at 26 Angstroms d-spacing and the following characteristics: a BET surface area of 785 m$^2$/g and adsorption capacities of 35.8 for water, 24.9 for cyclohexane and 18.9 for n-hexane.

EXAMPLE 3

TEOS and Al-DPAA were combined in the ratio 2:1 w/w producing a homogeneous liquid. 100 g of this liquid was hydrolyzed for several hours with 500 ml of water in a closed container in a steambox. The precipitated white solid (gel) was isolated by filtration and washed with water. It was incorporated into the MCM-41 synthesis mixture by mixing the following: 200 g of the CTMA hydroxide solution described in Example 2;

8 g of sodium aluminate solution (USALCO-45 from Nalco); 100 g of TMA-silicate (from SWAC, Inc.); 10% $SiO_2$ in tetramethylammonium hydroxide solution with molar ratio TMA/Si=0.5); and all of the gel (nominally 19 g of silica and 6.8 g alumina).

The mixture was reacted in a steambox for ~70 hours, followed by 24 hours at 130° C. with stirring at 100 RPM. It was filtered, washed with water, slurried with ethanol (~400 ml) and exchanged 3 times with 1M ammonium nitrate (~20 ml/ 1 g of solid). X-ray diffraction pattern of the as-sythesized material consisted of 4 peaks at 42.1, 24.1, 20.9 and 15.7 Angstroms, all ±1.0 Angstrom, d-spacing, which was indicative of the hexagonal MCM-41. Portions of the wet product were calcined in a closed muffle at ~500° C. or in a covered crucible. The product had the following characteristics: BET surface area of 681 m²/g and adsorption capacity of 18.6, 34.5, 24.9 and 20.8% for benzene, water, c-hexane and n-hexane, respectively.

COMPARATIVE EXAMPLE

Two hundred grams of cetyltrimethylammonium (CTMA) hydroxide solution prepared as in Example 1 was combined with 4.15 grams of sodium aluminate (43.5% $Al_2O_3$, 30% $Na_2O$) and 100 grams of aqueous tetramethylammonium (TMA) silicate solution and described in Example 3, with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was reacted in an autoclave at 120° C. for 24 hours with stirring at 100 RPM. The mixture had a composition in terms of moles per mole $Al_2O_3$:

1.25 moles $Na_2O$
27.8 moles $SiO_2$
5.1 moles $(CTMA)_2O$
4.40 moles $(TMA)_2O$
650 moles $H_2O$ The resulting solid product was recovered by filtration and dried in air at ambient temperature. The product was then calcined at 540° C. for 1 hour in nitrogen, followed by 6 hours in air. The X-ray diffraction pattern of the calcined product can be characterized as including a very strong relative intensity line at 37.0±2.0 Angstroms d-spacing and weak lines at 21.9±1.5 and 19.1±1.0 Angstroms.

The calcined product proved to have a surface area of 932 m²/g and the following equilibrium adsorption capacities in grams/100 grams:

| | |
|---|---|
| $H_2O$ | 15 |
| Cyclohexane | >50 |
| n-Hexane | 46 |
| Benzene | 63 |

The product was then ammonium exchanged with 1N $NH_4NO_3$ solution, followed by calcination at 540.

EXAMPLE 4

The catalysts described in the preceding Examples were tested in a bench-top glass unit. The test involved passing ethylbenzene (EB) with hydrogen gas as the carrier through a bed of 0.5 g catalyst at 427° C. and 5 WHSV, and the measurement of EB conversion after 10 min on stream. The results are compiled below:

| Catalyst/Example # | EB conversion, % |
|---|---|
| Comparative Example | 5.4 |
| Example 1 | 31.1 |
| Example 2 | 30.1 |
| Example 3 | 22.4 |

What is claimed is:

1. A method for synthesizing a composition of matter comprising an inorganic, porous, non-layered crystalline phase material exhibiting, after calcination, an X-ray diffraction pattern with at least one peak at a d-spacing greater than about 18 Angstrom Units with a relative intensity of 100 and a benzene adsorption capacity of greater than 15 grams benzene per 100 grams of said material at 50 torr and 25° C., said method comprising the steps of:
   (a) preparing a mixture capable of forming said composition, said mixture comprising a source of silica, a source of alumina, an organic (R') agent and a solvent or solvent mixture, wherein R' comprises an ion of the formula $R_1R_2R_3R_4Q^+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof;
   (b) maintaining said mixture under sufficient conditions of pH, temperature and time for formation of said composition of matter; and
   (c) recovering said composition of matter, wherein said source of silica and said source of alumina comprise hydrolyzable compounds which hydrolyze under the conditions of step (b) to give silica and alumina.

2. A method according to claim 1, wherein said hydrolyzable silicon and aluminum compounds comprise alkoxide moieties, and wherein said reaction mixture is heated under conditions sufficient to evaporate alcohol produced by the hydrolysis reaction.

3. A method according to claim 2, wherein water is added to the reaction mixture after hydrolysis of said hydrolyzable silicon and aluminum compounds.

4. A method according to claim 3, wherein said step (b) comprises heating the mixture of step (a) for at least one hour at a temperature of at least 100° C.

5. A method according to claim 4, wherein said hydrolyzable silicon compound is tetraethylorthosilicate and said hydrolyzable aluminum compound is aluminum (iso-propoxide)₂acetoacetic ester chelate.

* * * * *